United States Patent
Yamashita (10) Patent No.: US 10,277,815 B2
(45) Date of Patent: Apr. 30, 2019

(54) COMMUNICATION APPARATUS, CONTROL METHOD FOR THE COMMUNICATION APPARATUS, AND RECORDING MEDIUM

(71) Applicant: CANON KABUSHIKI KAISHA, Tokyo (JP)

(72) Inventor: Tomoya Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/347,504

(22) Filed: Nov. 9, 2016

(65) Prior Publication Data
US 2017/0142334 A1    May 18, 2017

(30) Foreign Application Priority Data

Nov. 16, 2015  (JP) ................. 2015-224229

(51) Int. Cl.
| | |
|---|---|
| G06F 1/32 | (2006.01) |
| G06F 1/26 | (2006.01) |
| G06F 1/00 | (2006.01) |
| H04N 5/232 | (2006.01) |
| H04W 4/80 | (2018.01) |
| G06F 9/4401 | (2018.01) |
| G06F 1/3234 | (2019.01) |
| G06F 1/3287 | (2019.01) |
| H04L 12/24 | (2006.01) |
| H04L 12/26 | (2006.01) |

(52) U.S. Cl.
CPC ....... *H04N 5/23241* (2013.01); *G06F 1/3278* (2013.01); *G06F 1/3287* (2013.01); *G06F 9/4403* (2013.01); *H04L 41/082* (2013.01); *H04L 43/08* (2013.01); *H04N 5/23206* (2013.01); *H04W 4/80* (2018.02); *Y02D 10/157* (2018.01); *Y02D 10/171* (2018.01)

(58) Field of Classification Search
CPC ...................................... G06F 1/32; G06F 1/26
See application file for complete search history.

(56) References Cited

U.S. PATENT DOCUMENTS

| | | | | |
|---|---|---|---|---|
| 5,541,853 | A | * | 7/1996 | Croft ..................... G06F 9/4843 709/212 |
| 5,841,991 | A | * | 11/1998 | Russell ................... H04L 29/06 709/221 |

(Continued)

FOREIGN PATENT DOCUMENTS

| | | |
|---|---|---|
| CN | 101946503 A | 1/2011 |
| CN | 102033595 A | 4/2011 |

(Continued)

*Primary Examiner* — Phil K Nguyen
(74) *Attorney, Agent, or Firm* — Canon U.S.A., Inc. IP Division (57) ABSTRACT

In a communication apparatus to which a battery can be detachably attached, even in a case where the communication apparatus is set to an off state, a power control unit supplies power to a communication unit, and the communication unit is communicable with an external apparatus by executing firmware held in a memory unit. When the power supply from the battery to the communication apparatus is supplied, even in a case where the communication apparatus is set to the off state by the setting unit, the power control unit supplies power to a transfer unit, and the transfer unit executes transfer of the firmware.

28 Claims, 5 Drawing Sheets

(56) References Cited

U.S. PATENT DOCUMENTS

| | | | | |
|---|---|---|---|---|
| 6,226,740 B1* | 5/2001 | Iga | ............... | G06F 9/4401 |
| | | | | 713/2 |
| 6,425,040 B1* | 7/2002 | Dewa | ............... | G06F 1/1632 |
| | | | | 361/726 |
| 2003/0188006 A1* | 10/2003 | Bard | ............... | H04W 84/20 |
| | | | | 709/232 |
| 2004/0003307 A1* | 1/2004 | Tsuji | ............... | G06F 1/3203 |
| | | | | 713/310 |
| 2004/0059926 A1* | 3/2004 | Angelo | ............... | G06F 21/10 |
| | | | | 713/189 |
| 2006/0112287 A1* | 5/2006 | Paljug | ............... | G06F 1/3209 |
| | | | | 713/300 |
| 2007/0220202 A1* | 9/2007 | Sutardja | ............... | G06F 1/3203 |
| | | | | 711/113 |
| 2011/0028096 A1 | 2/2011 | Tokunaga | | |
| 2011/0055539 A1* | 3/2011 | Sasaki | ............... | G06F 1/26 |
| | | | | 713/2 |
| 2011/0078464 A1* | 3/2011 | Yokomizo | ............... | G06F 1/3203 |
| | | | | 713/300 |
| 2013/0212418 A1* | 8/2013 | Ueda | ............... | G06F 1/3287 |
| | | | | 713/323 |

FOREIGN PATENT DOCUMENTS

| | | |
|---|---|---|
| CN | 102692986 A | 9/2012 |
| CN | 104053193 A | 9/2014 |
| CN | 104053194 A | 9/2014 |
| JP | 11-272347 A | 10/1999 |

\* cited by examiner

COMMUNICATION APPARATUS, CONTROL METHOD FOR THE COMMUNICATION APPARATUS, AND RECORDING MEDIUM

BACKGROUND OF THE INVENTION

Field of the Invention

The present invention relates, for example, to an image pickup apparatus and an information processing apparatus provided with communication functions such as a Bluetooth Low Energy (BLE) function and a wireless LAN function.

Description of the Related Art

A user desires that not only an image pickup apparatus but also an electronic device and an information processing apparatus can promptly return from a power off state or a power saving state. Japanese Patent Laid-Open No. 11-272347 describes a configuration in which an information processing apparatus previously loads an instruction into a cache and executes this instruction when its operation is resumed from being suspended. As a result, a guarantee that it is possible to use a ROM and a RAM can be secured by software previously loaded on the cache of a CPU instead of hardware.

An image pickup apparatus of recent years is equipped with communication functions such as a Bluetooth Low Energy (BLE) function and a wireless LAN function. These communication functions are executed by a communication unit or the like in accordance with a control program such as a firmware downloaded from a microcomputer such as a CPU, a memory, or the like. At this time, in a case where the downloaded firmware is developed into a volatile memory or the like to be executed, the firmware needs to be downloaded again each time a power source is turned on. Since the download of the firmware takes a certain period of time, an issue is to determine at which timing the download is performed.

SUMMARY OF THE INVENTION

According to an aspect of the present invention, a communication apparatus to which a detachable battery can be attached, the communication apparatus comprising a setting unit configured to set on or off of the communication apparatus, a power control unit configured to control power supply to respective units of the communication apparatus from the battery, a storage unit configured to store firmware, a communication unit that includes a memory unit different from the storage unit and configured to hold the firmware and that is configured to communicate with an external apparatus by executing the firmware held in the memory unit, and a transfer unit configured to transfer the firmware stored in the storage unit to the communication unit to be held in the memory unit, wherein the power control unit supplies power to the communication unit even in a case where the communication apparatus is set to be off, and the communication unit is communicable with the external apparatus by executing the firmware held in the memory unit, and wherein, when the power supply from the battery to the communication apparatus is started, even in a case where the communication apparatus is set to be off by the setting unit, the power control unit supplies power to the transfer unit, and the transfer unit executes the transfer of the firmware.

Further features of the present invention will become apparent from the following description of exemplary embodiments with reference to the attached drawings.

DESCRIPTION OF THE EMBODIMENTS

First Exemplary Embodiment

Function of an Image Pickup Apparatus

Figure 1:
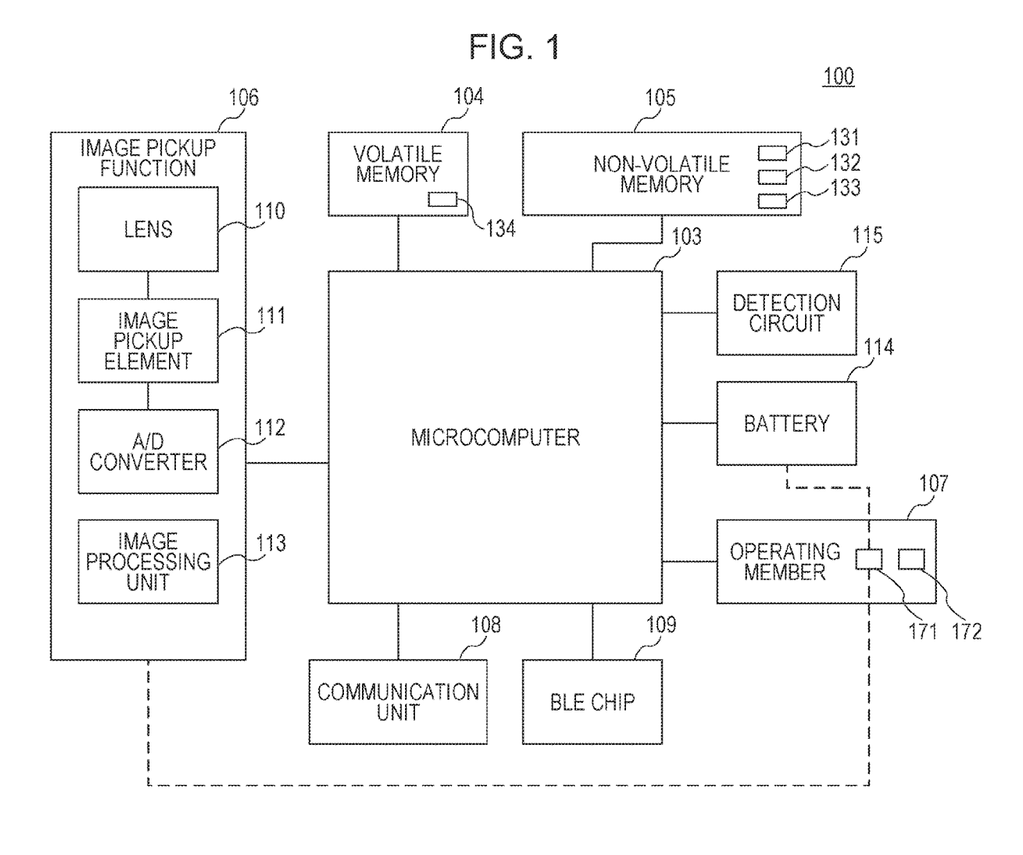
FIG. 1 is a block diagram illustrating an image pickup apparatus.

FIG. 1 illustrates a configuration example of an image pickup apparatus 100 according to a first exemplary embodiment. An image pickup function 106 is an aggregate of functions related to image pickup processing such as a lens 110, an image pickup element 111, an analog-to-digital (A/D) converter 112, and an image processing unit 113. The lens 110 is an optical component that focuses light from an object on an image pickup plane of the image pickup element 111. Types of the lens 110 include a fixed focal length lens and a zoom lens. It should be noted that the lens 110 may also include a lens that moves in an optical axis direction for realizing auto focus, a motor that drives the lens, and the like in addition to an image-forming lens. A charge-coupled device (CCD), a complementary metal-oxide semiconductor (CMOS) sensor, or the like is used as the image pickup element 111. The image pickup element 111 converts an object image into an electric signal. The A/D converter 112 converts an analog signal output from the image pickup element 111 into a digital signal to be output to a microcomputer 103. The microcomputer 103 is a control unit configured to execute controls of the respective components, data processing, or the like. The image processing unit 113 generates a file in a JPEG or BMP format by applying predetermined image processing to the object image (digital signal) obtained through the image pickup element 111. The predetermined image processing includes, for example, RAW development processing, application of a filter effect, or the like.

An operating member 107 includes a power switch 171 configured to perform an on/off switching instruction, an image pickup system button 172, and the like. The image pickup system button 172 is, for example, a shutter button, an auto focus (AF) start button, or the like.

A volatile memory 104 is a storage device that temporarily holds information used for performing control in the microcomputer 103 such as information written to a non-volatile memory 105. It should be noted that the volatile memory 104 may store the flag 134 indicating whether or not download of the firmware to a BLE chip 109 that will be described below is preferentially executed.

The non-volatile memory 105 holds a control program 131 executed by the microcomputer 103 and information that should be held even when the power switch 171 of the image pickup apparatus 100 is kept off. For example, the non-volatile memory 105 stores a control program such as firmware 132 executed by the BLE chip 109 that will be described below, management information 133 used to determine on or off of a flag 134, or the like.

A communication unit 108 is a unit configured to communicate with an external electronic device. For example, the communication unit 108 is a wireless communication function or the like such as Bluetooth (registered trademark), wireless LAN, or ZigBee. The function of Bluetooth (registered trademark) of the communication unit 108 is a function in conformity to a communication standard of a version that is incompatible with the BLE. The BLE chip 109 is a communication chip in conformity to Bluetooth Low Energy. A detail of the BLE chip 109 will be described below.

A battery 114 is a power source that can be attached to and detached from the image pickup apparatus 100. Even when the power switch 171 is off, the battery 114 can supply power to the microcomputer 103, the volatile memory 104, the non-volatile memory 105, the detection circuit 115, the BLE chip 109, and the like.

When the power switch 171 is switched to on in a state in which the battery 114 is attached, the battery 114 also supplies power to the image pickup function 106 through the power switch 171. The detection circuit 115 is a circuit configured to detect whether or not the battery 114 is attached to a battery holder of the image pickup apparatus 100.

It should be noted that, when the battery 114 is attached, the microcomputer 103 supplied with power checks a state of the power switch 171 and performs activation processing as it is when the state is on. On the other hand, when the power switch 171 is off, the microcomputer 103 performs power-off processing. That is, in a case where the battery 114 is attached in a state in which the power switch 171 is off, the power supply is once performed from the power source, and thereafter the power-off processing is performed. The series of processings do not need to be processing that can be recognized by a user. Even when the battery 114 is attached in a state in which the power switch 171 is off, the image pickup apparatus 100 may operate as if the power source does not look like being turned on.

Outline of the BLE Chip

Here, the BLE chip 109 will be described in detail. When the power source is turned on, the BLE chip 109 executes handshake for initialization with the microcomputer 103 and downloads the firmware 132 from the microcomputer 103. The BLE chip 109 executes the firmware 132 downloaded from the microcomputer 103, so that a BLE communication can be executed. That is, the BLE chip 109 does not execute the BLE communication until the firmware 132 is downloaded from the microcomputer 103.

The image pickup apparatus 100 communicates with a partner device by using the BLE chip 109. The image pickup apparatus 100 performs input of a passcode or the like and recognizes the partner device as a communication partner to be registered in a predetermined area of the non-volatile memory 105 (pairing processing). It is possible to establish a communication with the partner with which the pairing processing has been performed once by performing a predetermined authentication procedure.

It should be noted that the BLE chip 109 according to the present exemplary embodiment can maintain the communication if power is supplied from the battery 114 even when the power switch 171 in the operating member 107 is off. That is, the BLE chip 109 can maintain the communicable state with the partner device in a state in which power is supplied from the battery 114.

In addition, the communication unit 108 and the BLE chip 109 can respectively separately communicate with the partner device. The BLE chip 109 can also hand over the communication from the BLE chip 109 to the communication unit 108 in accordance with a handover instruction from the microcomputer 103. For example, the image pickup apparatus 100 and the partner device may start a communication session via the BLE chip 109 and thereafter hand over this communication session to the communication unit 108. For example, image data in a RAW format has a larger data size than image data in a JPEG format. Therefore, the communication unit 108 that can perform a large capacity communication at a high speed is more appropriate to transfer the image data. Thus, a communication is started via the BLE chip 109, and thereafter, this communication may be handed over to the communication unit 108 and used for the transfer of the image data.

Function of the BLE Chip

Figure 2:
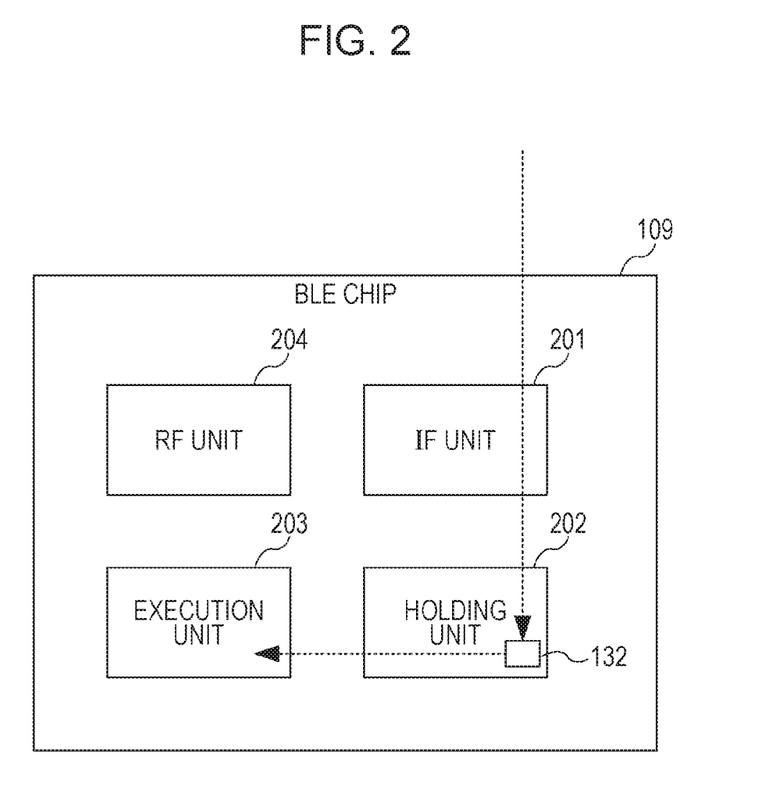
FIG. 2 is a block diagram illustrating functions of a BLE chip and a communication unit.

FIG. 2 illustrates a function of the BLE chip 109. An IF unit 201 of the BLE chip 109 is a communication circuit configured to execute a communication with the microcomputer 103. When power is supplied from the battery 114, the IF unit 201 is activated to execute handshake with the microcomputer 103. When the handshake is completed, the IF unit 201 downloads the firmware 132 from the microcomputer 103 to be stored in a holding unit 202.

The holding unit 202 includes a volatile memory and holds the firmware 132 or the like. When the battery 114 is detached from the image pickup apparatus 100, the holding unit 202 loses the power source, and the firmware 132 disappears. Therefore, the firmware 132 needs to be downloaded from the microcomputer 103 to the holding unit 202 each time the battery 114 is attached to the image pickup apparatus 100.

It should be noted that the user does not use the BLE function until the download of the firmware 132 is completed. Therefore, it is demanded for the user who uses the BLE function that the download of the firmware 132 is promptly completed, and the BLE function can be used. For example, it is supposed that the image pickup function 106 of the image pickup apparatus 100 is controlled by an external device such as a BLE remote controller having the BLE function or a smart phone. In the above-described case, it is conceivable that the user operates the BLE remote controller at a photo opportunity, and the power source of the image pickup apparatus 100 is turned on. In this case, it is conceivable that the BLE chip 109 needs to be communicable with the BLE remote controller as promptly as possible so as not to miss the photo opportunity.

An execution unit 203 is a processor configured to control the BLE communication with the external device by executing the firmware 132. An RF unit 204 is a wireless circuit configured to execute the BLE communication.

It should be noted that the communication unit 108 may also have a function similar to the BLE chip 109. That is, FIG. 2 also illustrates the function of the communication unit 108.

As described above, the BLE chip 109 is an example of the communication unit that can hold the firmware 132 during a period in which power is supplied from the battery 114 whereas the firmware 132 disappears during a period in which power is not supplied from the battery 114.

It should be noted that the BLE chip according to the present exemplary embodiment can adopt various configurations and may operate as a wireless communication unit (wireless communication module) that can use the BLE. For example, an antenna may be built in the chip, or a separate antenna from the chip may be prepared to form the wireless communication unit as a whole. In addition, the BLE chip may include a non-volatile memory and hold its own control program or the like in addition to the firmware 132. Moreover, the BLE chip may be a combo chip also including another communication unit such as a wireless LAN communication unit therein.

Firmware Transfer Processing

Figure 3:
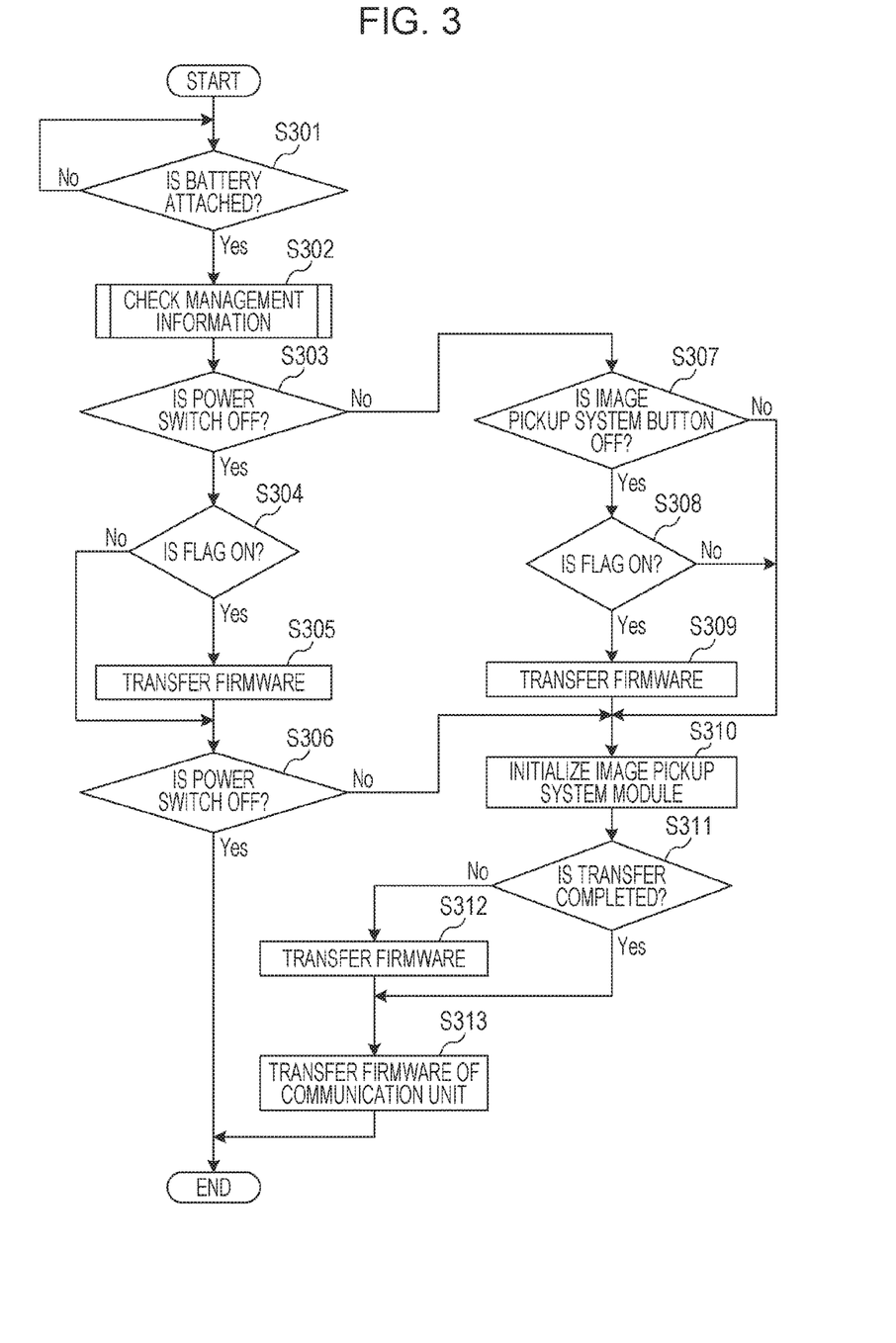
FIG. 3 is a flow chart illustrating transfer processing of firmware.
Figure 4:
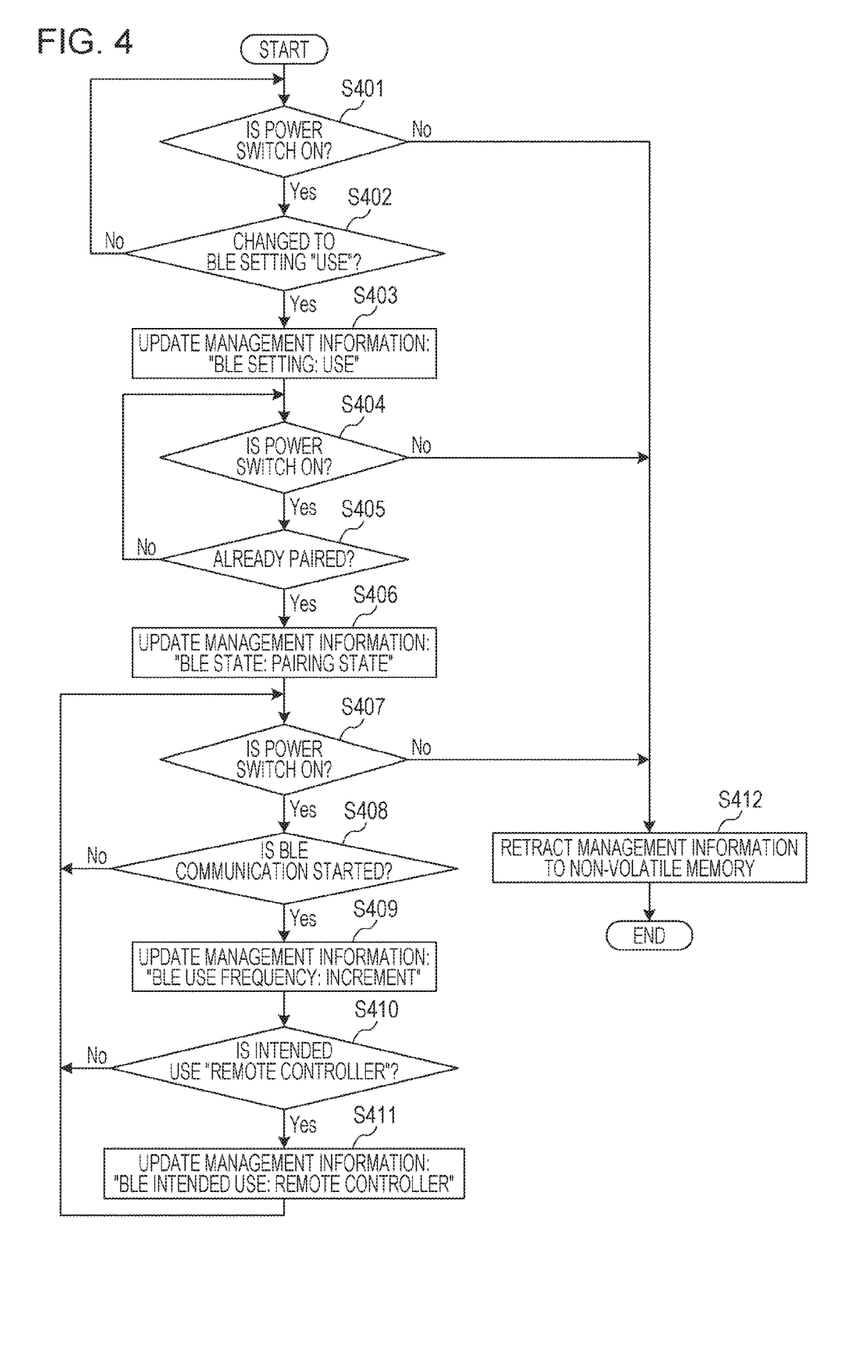
FIG. 4 is a flow chart illustrating update processing of management information.
Figure 5:
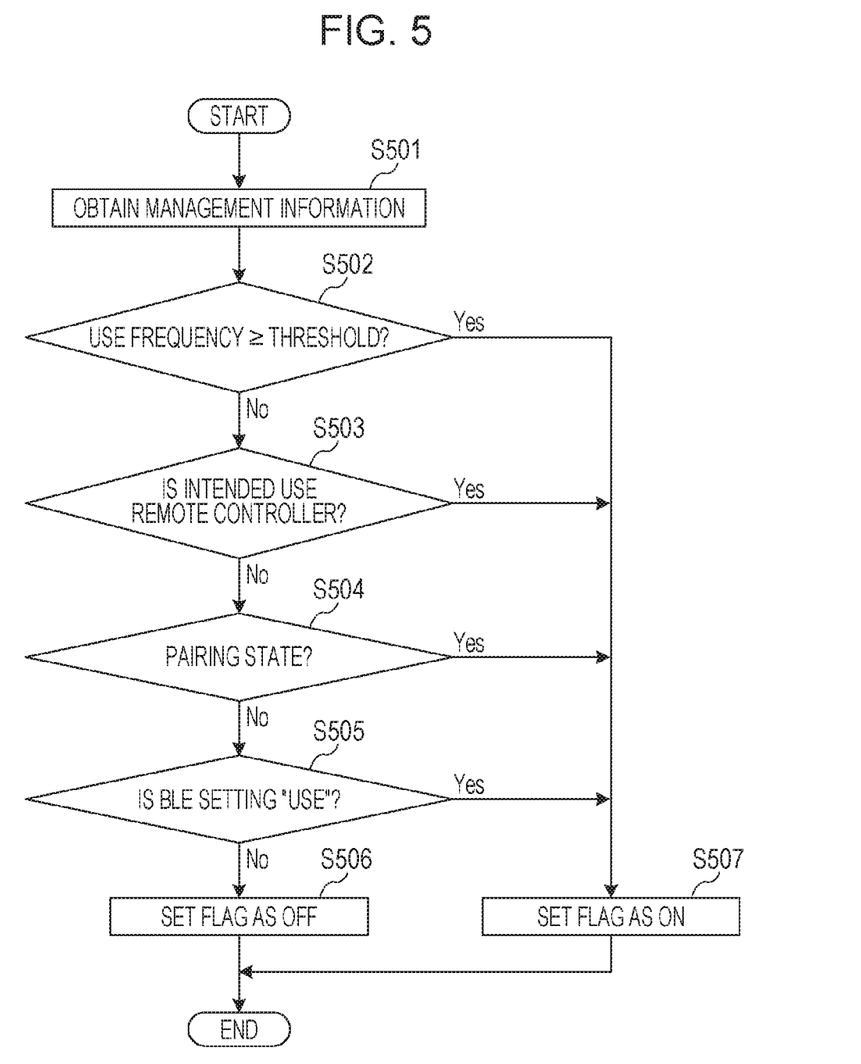
FIG. 5 is a flow chart illustrating checking processing of the management information.

Hereinafter, an example will be described with reference to FIG. 3 to FIG. 5. FIG. 3 illustrates transfer processing of the firmware executed by the microcomputer 103.

In S301, in a case where the battery 114 is attached to the image pickup apparatus 100, this processing is started. When the battery 114 is attached to the image pickup apparatus 100, the microcomputer 103 is supplied with power from the battery 114 and is activated. It should be noted that the microcomputer 103 and the battery 114 are not connected to each other via the power switch 171. For this reason, the microcomputer 103 is supplied with power from the battery 114 without depending on whether the power switch 171 is on or off. The detection circuit 115 includes a mechanical switch. When the battery 114 is attached to a battery holder, the mechanical switch is pressed by the battery 114 to turn on or off contact points. Therefore, the detection circuit 115 outputs a detection signal indicating on or off of the mechanical switch to the microcomputer 103. The microcomputer 103 determines attachment or detachment of the battery 114 on the basis of the detection signal. It should be noted that the above-described mechanical switch may also be referred to as a power detection switch. When it is detected that the battery 114 is attached, the processing proceeds to S302.

In S302, the microcomputer 103 executes check processing of the management information 133. A detail of the check processing will be described below.

In S303, the microcomputer 103 determines whether or not the power switch 171 is switched to off. A level of the detection signal is set at high when the power switch 171 is switched to on, and the level of the detection signal is set at low when the power switch 171 is switched to off. A generation circuit configured to generate this detection signal may be part of the detection circuit 115. The microcomputer 103 determines whether or not the power switch 171 is switched to off on the basis of the level of the detection signal output by the power switch 171. When it is determined that the power switch 171 is switched to off, the processing proceeds to S304. When it is determined that the power switch 171 is switched to on, the processing proceeds to S307.

In S304, the microcomputer 103 determines whether or not the flag 134 based on the management information 133 is on. Herein, a situation where the flag 134 is on means that the firmware should be preferentially transferred. A situation where the flag 134 is off means that the firmware is not to be preferentially transferred. Therefore, the microcomputer 103 determines whether or not the firmware should be preferentially transferred on the basis of the flag 134. When the flag 134 is off, since it is not necessary to preferentially execute the transfer of the firmware 132, the microcomputer 103 skips S305 and proceeds to S306. On the other hand, when the flag 134 is on, since it is necessary to preferentially execute the transfer of the firmware 132, the processing proceeds to S305.

In S305, the microcomputer 103 transfers the firmware 132 to the BLE chip 109.

In S306, the microcomputer 103 determines again whether or not the power switch 171 is switched to off. When it is determined that the power switch 171 is switched to off, the microcomputer 103 ends the processing related to the flow chart illustrated in FIG. 3. It should be noted that, when it is determined that the power switch 171 is switched to off, the processing returns to S306, and the state of the power switch 171 may be kept monitored. On the other hand, when it is determined that the power switch 171 is switched to on, the processing proceeds to S310.

On the other hand, in S303, when it is determined that the power switch 171 is switched to on, the processing proceeds to S307. In S307, the microcomputer 103 determines whether or not the image pickup system button 172 is off. It should be noted that a situation where the image pickup system button 172 is off may be one of conditions for executing the preferential transfer of the firmware. When it is determined that the image pickup system button 172 is off (not operated by the user), the processing proceeds to S308. When it is determined that the image pickup system button 172 is on (operated by the user the user), the processing skips S308 and S309 and proceeds to S310. In this manner, the microcomputer 103 determines whether or not the transfer of the firmware should be prioritized depending on whether or not the image pickup system button 172 is off. When the image pickup system button 172 is on, it is estimated that the user desires to perform image pickup by directly operating the image pickup apparatus 100, and initialization of an image pickup system module that will be described below is prioritized.

In S308, the microcomputer 103 determines whether or not the flag 134 is on. When the flag 134 is off, since the transfer of the firmware 132 is not to be preferentially executed, the processing skips S309 and proceeds to S310. When the flag 134 is on, since the transfer of the firmware 132 should be preferentially executed, the processing proceeds to S309.

In S309, the microcomputer 103 transfers the firmware 132 to the BLE chip 109.

In S310, the microcomputer 103 executes initialization processing of the image pickup system module. The image pickup system module refers to a program module configured to control the image pickup function 106 or hardware such as the image pickup function 106. A variable or the like used by the image pickup system module is initialized by the initialization processing.

In S311, the microcomputer 103 determines whether or not the transfer of the firmware 132 is completed. Herein, a transfer completion flag may be used. When the transfer of the firmware 132 is executed in S305 or S309, the microcomputer 103 switches the transfer completion flag from off to on. The transfer completion flag is also held in the volatile memory 104. Therefore, the microcomputer 103 determines whether or not the transfer of the firmware 132 is completed depending on whether the transfer completion flag is on or off. When the transfer of the firmware 132 is completed, the processing skips S312 and proceeds to S313. On the other hand, when the transfer of the firmware 132 is not completed, the processing proceeds to S312.

In S312, the microcomputer 103 transfers the firmware 132 to the BLE chip 109. As a result, the BLE chip 109 can execute a communication in conformity to the BLE standard.

In S313, the microcomputer 103 transfers the firmware for the wireless LAN to the communication unit 108. As a result, the communication unit 108 can execute a communication in conformity to the wireless LAN standard. The firmware for the communication unit 108 is also held in the non-volatile memory 105. It should be noted that the transfer of the firmware to the communication unit 108 does not necessarily need to be executed at this timing. The transfer of the firmware to the communication unit 108 can be executed at an arbitrary timing after the transfer of the firmware 132 to the BLE chip 109 is completed. In a communication between the image pickup apparatus 100 and the external device, first, a communication session is established via the BLE chip 109, and the communication session is handed over to the communication unit 108. Therefore, the BLE chip 109 needs to be shifted to a communicable state before the communication unit 108.

Management Information Update Processing

Next, with reference to FIG. 4, update processing of the management information 133 will be described. The management information 133 refers to information for managing how the user uses the BLE function. Specifically, the management information 133 is information indicating a use situation of the BLE function since the battery 114 is attached and the battery 114 is detached. For example, the management information 133 may include setting information (use information) indicating whether or not the BLE function is used, state information indicating whether or not the image pickup apparatus 100 has been already paired with the external device, frequency information indicating a use frequency of the BLE, intended use information indicating an intended use of the BLE, and the like. These pieces of information are only examples. It is not necessarily needed to use all of these pieces of information, and other information indicating a use situation of the BLE function may also be used. While the image pickup apparatus 100 is operated (the power switch 171 is on), the volatile memory 104 holds the management information 133. The microcomputer 103 saves the management information 133 held in the volatile memory 104 in the non-volatile memory 105 regularly or when a predetermined condition is satisfied.

In S401, the microcomputer 103 determines whether or not the power switch 171 is on. As described above, this determination is executed on the basis of the detection signal output from the power switch 171. When the power switch 171 is not on (that is, the power switch 171 is off), the processing proceeds to S412. When the power switch 171 is on, the processing proceeds to S402. In S402, the microcomputer 103 determines whether or not a BLE setting is "use". The user operates the operating member 107 to display a setting menu on a display device, and the BLE setting can be set as "use" or "not to use". When it is determined that the BLE setting is "use", the processing proceeds to S403. When it is determined that the BLE setting is not "use" (that is, "not to use"), the processing returns to S401.

In S403, the microcomputer 103 updates the management information 133 so as to indicate that the BLE function is used. The setting information indicating whether or not the BLE function is used is part of the management information 133.

In S404, the microcomputer 103 determines whether or not the power switch 171 is on. In a case where the power switch 171 is not on (that is, the power switch 171 is off), the processing proceeds to S412. When the power switch 171 remains on, the processing proceeds to S405. In S405, the microcomputer 103 determines whether or not the image pickup apparatus 100 has been already paired with the external device. For example, the microcomputer 103 refers to the non-volatile memory 105 and determines whether or not the image pickup apparatus 100 has been already paired with the external device. It should be noted that pairing information may be managed in the BLE chip 109, and the microcomputer 103 may obtain the pairing information from the BLE chip 109. When the BLE chip 109 has not been already paired with the external device, the microcomputer 103 returns to S404. On the other hand, when the image pickup apparatus 100 has been already paired with the external device, the processing proceeds to S406.

In S406, the microcomputer 103 updates the management information 133 so as to indicate that the image pickup apparatus 100 has been already paired. The state information indicating that the image pickup apparatus 100 has been already paired is part of the management information 133.

In S407, the microcomputer 103 determines whether or not the power switch 171 is on. When the power switch 171 is not on (the power switch 171 off), the processing proceeds to S412. When the power switch 171 remains on, the processing proceeds to S408.

In S408, the microcomputer 103 determines whether or not the BLE communication by the BLE chip 109 is started. The microcomputer 103 obtains the state information indicating whether or not the BLE communication is started from the BLE chip 109 and determines whether or not the BLE communication is started. When the BLE communication is not started, the processing returns to S407. When the BLE communication is started, the processing proceeds to S409.

In S409, the microcomputer 103 increments the BLE use frequency by 1 to update the frequency information included in the management information 133.

In S410, the microcomputer 103 determines whether or not the intended use of the BLE communication is a remote controller. For example, the microcomputer 103 may determine the intended use depending on whether or not data transferred by the BLE communication is a control command of the remote controller. The intended use of the BLE communication includes image viewing, image editing, image deletion, trimming, rating, time/area setting, or the like. A remote controller operation includes a still image pickup instruction, an operation related to live viewing, an operation related to movie recording, or the like. That is, when the BLE chip 109 receives the control command from the remote controller corresponding to the external device, the microcomputer 103 executes the received control command. The microcomputer 103 determines whether or not the intended use is the remote controller on the basis of a content of the control command. When the intended use is not the remote controller, the processing returns to S407. On the other hand, when the intended use is the remote controller, the processing proceeds to S411.

In S411, the microcomputer 103 updates the intended use information included in the management information 133 so as to indicate that the intended use is the remote controller. Thereafter, the processing returns to S407.

It should be noted that when the power switch 171 is switched to off in S401, S404, or S407, the processing proceeds to S412, and the microcomputer 103 promptly retracts the management information 133 from the volatile memory 104 to the non-volatile memory 105.

Management Information Check Processing

Next, with reference to FIG. 5, the check processing of the management information 133 will be described. This check processing is processing equivalent to S302 described above. The microcomputer 103 determines whether or not the transfer of the firmware 132 to the BLE chip 109 should be preferentially executed on the basis of the management information 133 and reflects a determination result on the flag 134.

In S501, the microcomputer 103 obtains the management information 133 from the non-volatile memory 105.

In S502, the microcomputer 103 determines whether or not the BLE use frequency is higher than or equal to a predetermined threshold on the basis of the frequency information included in the management information 133. The threshold is a value previously set at the time of shipment of the image pickup apparatus 100. When the BLE use frequency is higher than or equal to the predetermined threshold, it is assumed that the user often uses the BLE chip 109, and the processing proceeds to S507.

In S507, the microcomputer 103 sets the flag 134 as on. On the other hand, when the BLE use frequency is lower than the predetermined threshold, it is assumed that the user does not often use the BLE chip 109, and the processing proceeds to S503.

In S503, the microcomputer 103 determines whether or not the intended use of the BLE chip 109 is a remote controller on the basis of the intended use information included in the management information 133. When the intended use is the remote controller, the processing proceeds to S507. On the other hand, when the intended use is not the remote controller, the processing proceeds to S504.

In S504, the microcomputer 103 determines whether or not the BLE chip 109 is set as "use" on the basis of the set information included in the management information 133. When the BLE chip 109 is set as "use", the processing proceeds to S507. When the BLE chip 109 is not set as "use", the processing proceeds to S506. In S506, the microcomputer 103 sets the flag 134 as off.

Overview

The image pickup function 106 including the image pickup element 111 and the like is an example of an image pickup unit configured to pick up an image of the object. The BLE chip 109 is an example of a first communication unit configured to communicate with the external device. A storage area corresponding to part of the non-volatile memory 105 is an example of a first storage unit configured to store first firmware (for example, the firmware 132) which is transferred to the BLE chip 109 to be executed. The non-volatile memory 105 and the volatile memory 104 are an example of a second storage unit configured to store management information (for example, the flag 134 or the management information 133) for determining whether or not the transfer of the firmware 132 to the BLE chip 109 is preferentially executed. The microcomputer 103 is an example of a control unit operated by power supplied from the power source (for example, the battery 114). As described with reference to FIG. 3, the management information 133 or the flag 134 may indicate in some cases that the transfer of the firmware 132 to the BLE chip 109 is preferentially executed. In this case, in S307, the microcomputer 103 executes the transfer of the firmware 132 before the power supply from the battery 114 to the image pickup function 106 is instructed (started). On the other hand, the management information 133 or the flag 134 does not indicate in some cases that the transfer of the firmware 132 to the BLE chip 109 is preferentially executed. In this case, after the power supply to the image pickup function 106 from the battery is instructed (started), the microcomputer 103 executes the transfer of the firmware 132 in S309 or S312. In other words, the microcomputer 103 functions as a transfer unit configured to transfer the firmware 132 to the BLE chip 109 during a predetermined period. The predetermined period is, for example, a period since the battery 114 is attached until power is supplied from the battery 114 to the image pickup function 106 through the power switch 171. In this manner, according to the present example, the time used until the communication function included in the image pickup apparatus 100 or the like can be used is shortened.

As described above with regard to S502, the management information 133 may include use frequency information indicating the use frequency of the BLE chip 109. When the use frequency information indicating the use frequency is higher than or equal to a threshold, the microcomputer 103 functions as a determination unit configured to determine that the transfer of the firmware 132 is preferentially executed. On the other hand, when the use frequency is not higher than or equal to the threshold, the microcomputer 103 may determine that the transfer of the firmware 132 is not preferentially executed. In this manner, since the transfer of the firmware 132 is preferentially executed in a case where the user frequently uses the BLE function, the waiting time of the user may be shortened.

As described above with regard to S503, the management information 133 may include the intended use information indicating the intended use of the BLE chip 109. When the intended use of the BLE chip 109 indicated by the intended use information is the remote controller, the microcomputer 103 may determine that the transfer of the firmware 132 is preferentially executed. On the other hand, when the intended use of the BLE chip 109 is not the remote controller, the microcomputer 103 may determine that the transfer of the firmware 132 is not preferentially executed. In this manner, since the transfer of the firmware 132 is preferentially executed in a case where the user uses the BLE remote controller, the waiting time of the user may be shortened.

As described above with regard to S504, the management information 133 may include the state information indicating whether or not the image pickup apparatus 100 is in a pairing state in which the image pickup apparatus 100 is paired with the other communication device. When the state information indicates that the image pickup apparatus 100 is in the pairing state, the microcomputer 103 may determine that the transfer of the firmware 132 is preferentially executed. When the state information indicates that the image pickup apparatus 100 is not in the pairing state, the microcomputer 103 may determine that the transfer of the firmware 132 is not preferentially executed. In this manner, since the BLE chip 109 attempts the communication with the pairing partner when the image pickup apparatus 100 is in the pairing state, the transfer of the firmware 132 should be preferentially executed. As a result, the waiting time of the user may be shortened.

As described above with regard to S505, the management information 133 may include the setting information (use information) indicating whether or not the BLE chip 109 is used by the user. When the use information indicates that the BLE chip 109 is in a state in which the BLE chip 109 is used by the user, the microcomputer 103 may determine that the transfer of the firmware 132 is preferentially executed. When the use information indicates that the BLE chip 109 is not in a state in which the BLE chip 109 is used by the user, the microcomputer 103 may determine that the transfer of the firmware 132 is not preferentially executed. In this manner, in a case where the BLE function is activated, the transfer of the firmware 132 should be preferentially executed. As a result, the waiting time of the user may be shortened.

The power switch 171 is an example of a switching unit configured to switch whether or not power supplied from the power source is supplied to the image pickup function 106. Even when the power switch 171 is switched such that power is not supplied to the image pickup function 106, the management information 133 may indicate in some cases that the transfer of the firmware 132 to the BLE chip 109 is preferentially executed. In the above-described case, the microcomputer 103 may preferentially execute the transfer of the firmware 132 to the BLE chip 109. In this manner, the transfer of the firmware 132 is preferentially executed before the power switch 171 is switched, so that the waiting time of the user may be shortened.

The power source of the image pickup apparatus 100 is, for example, the detachable battery 114. It should be noted however that an alternating current (AC) adapter can also be used as the power source of the image pickup apparatus 100. When some conditions are satisfied, the microcomputer 103 may preferentially execute the initialization processing of the image pickup function 106 over the transfer of the firmware 132 to the BLE chip 109 in S310. One of the above-described conditions is that the management information 133 indicates that the transfer of the firmware 132 is preferentially executed. Another condition is that, when the microcomputer 103 is activated while the battery 114 is attached to the image pickup apparatus 100, the power switch 171 is switched such that power is supplied to the image pickup function 106. Still another condition is that an operation instruction for instructing the operation of the image pickup function 106 is input. Furthermore, when the initialization processing of the image pickup function 106 is completed, the microcomputer 103 may execute the transfer of the firmware 132 to the BLE chip 109 in S312. In this manner, while the image pickup processing is prioritized over the transfer of the firmware 132, it becomes more unlikely for the user to miss the photo opportunity. When the transfer of the firmware 132 is preferentially executed over the initialization processing of the image pickup function 106 to complete the transfer of the firmware 132 while the following conditions are satisfied, the microcomputer 103 may execute the initialization processing of the image pickup function 106. One of the conditions is that the management information 133 indicates that the transfer of the firmware 132 is preferentially executed. Another condition is that the power switch 171 is switched such that power is supplied to the image pickup function 106 when the battery 114 is attached to the image pickup apparatus to be activated. Still another condition is that the operation instruction for instructing the operation of the image pickup function 106 is not input.

As described above with regard to S313, the communication unit 108 is an example of a second communication unit configured to communicate with the external device. The non-volatile memory 105 is an example of a third storage unit configured to store second firmware transferred to the communication unit 108 to be executed. After the transfer of the firmware 132 to the BLE chip 109 is completed, the microcomputer 103 may execute the transfer of the second firmware to the communication unit 108. In a case where a communication session is handed over from the BLE chip 109 to the communication unit 108, the BLE chip 109 needs to be operated before the communication unit 108. Therefore, the transfer of the firmware 132 to the BLE chip 109 is prioritized over the transfer of the second firmware to the communication unit 108. It should be noted that the communication unit 108 may be a wireless LAN chip that executes a communication in conformity to the wireless LAN standard but may also be a communication chip in conformity to another communication standard. The timing for transferring the second firmware to the communication unit 108 may be a timing for switching the power switch 171 to on or a timing later than the above-described timing. In addition, the microcomputer 103 may transfer the second firmware to the communication unit 108 in parallel with the transfer of the firmware 132 to the BLE chip 109.

It should be noted that the image pickup apparatus 100 has been described in the present example, but the configuration may be applied to a personal computer, a hand-held device represented by a mobile phone such as a smart phone, or an information processing apparatus so-called a tablet device or the like in the present example.

According to the above-described example, on (priority) or off (nonpriority) of the flag 134 is determined on the basis of the management information 133. However, the microcomputer 103 may directly determine priority or nonpriority from the management information 133 without using the flag 134.

Second Exemplary Embodiment

The first exemplary embodiment is mainly aimed at shortening the waiting time of the user when the power switch of the image pickup apparatus 100 is switched from the off state to the on state. In addition to the above, according to the following exemplary embodiment too, an advantage is attained while the firmware 132 is downloaded at the time of the attachment of that the battery 114.

The image pickup apparatus 100 according to the present exemplary embodiment maintains the power supply to the BLE chip 109 even in a case where the user switches the power switch 171 from on to off. As a result, the BLE chip 109 continues holding the firmware 132 in the holding unit 202. The BLE chip 109 that has received the power supply continues searching for a peripheral device even when the power switch 171 is off and establishes the BLE communication with the found peripheral device corresponding to the communication partner. A power consumption of the BLE chip 109 is lower than the power for operating the entire image pickup apparatus 100. The image pickup apparatus 100 according to the present exemplary embodiment supplies power only to part related to the BLE chip 109 when the power switch 171 is in the off state to suppress the power consumption, and it is possible to regularly maintain the communicable state based on the BLE.

Even when the user of the image pickup apparatus 100 described above turns off the power switch 171 after using the image pickup apparatus 100, the communication based on the BLE may be regularly performed in the background.

However, for example, when the user replaces the battery 114 while the power switch 171 is in the off state, the firmware 132 disappears at a timing at which the battery 114 is detached. Therefore, even when the battery 114 is attached again, unless the firmware 132 is downloaded, the search for the peripheral device by the BLE chip 109 is not performed, and as a result, reconnection with the communication partner is not performed.

That is, according to a related-art technology, for example, when the user replaces the battery 114 while the power switch 171 is in the off state, the BLE chip 109 does not perform the communication thereafter. However, the user does not recognize this situation, and the user may think that the communication based on the BLE is resumed even after the replacement of the battery in some cases. In view of the above, according to the present exemplary embodiment, similarly as in the first exemplary embodiment, the firmware 132 is downloaded to the BLE chip 109 at the time of the attachment of the battery. With this configuration, the communication based on the BLE can be performed even after the replacement of the battery.

It should be noted that, according to the present exemplary embodiment, the management information according to the first exemplary embodiment does not necessarily need to be used. For example, at the time of the attachment of the battery 114, the firmware 132 may be regularly downloaded to the BLE chip 109. In addition, although being partially redundant with the management information, the following information may be used. For example, an item regarding on/off of the BLE function is prepared for the setting of the image pickup apparatus 100, and the download may be executed in a case where the BLE function is set to be on. In addition, for example, an item regarding variation/invalidation of the BLE communication in the power off state is prepared for the setting of the image pickup apparatus 100, and the download may be executed in a case where the variation is set in this item. In addition, for example, the download may be executed in a case where the device that has been already paired with the image pickup apparatus 100 exists.

In this manner, the image pickup apparatus 100 has been described as an example of the communication apparatus according to the second exemplary embodiment. The power switch 171 is an example of a setting unit configured to set the communication apparatus to an on state or an off state. The microcomputer 103 is an example of a power control unit configured to control the power supply to the respective units of the image pickup apparatus 100 from the detachable power source. The non-volatile memory 105 is an example of a storage unit configured to store the firmware. The BLE chip 109 is an example of a communication unit provided with a memory that stores the firmware and configured to communicate with the external device by executing the firmware held in the memory. The microcomputer 103 functions as a transfer unit configured to transfer the firmware stored in the storage unit to the communication unit. When the power source is attached to the image pickup apparatus 100, even when the image pickup apparatus 100 is set to be either on or off, power is supplied to the communication unit and the transfer unit from the power source. Even when the power switch 171 is off, the transfer unit transfers the firmware stored in the non-volatile memory 105 to the memory of the BLE chip 109. A state in which the power source is attached to the image pickup apparatus 100, power is supplied to the BLE chip from the power source, and also, the firmware is held in the memory of the BLE chip 109 is a transition condition. When the transition condition is satisfied, even when the image pickup apparatus 100 is set to be either on or off, the BLE chip 109 is shifted to the communicable state with the external device while the firmware held in the memory is executed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-224229, filed Nov. 16, 2015, which is hereby incorporated by reference herein in its entirety.

What is claimed is:

1. A communication apparatus to which a battery can be detachably attached, the communication apparatus comprising:
    a power switch configured to set the communication apparatus to an on state or an off state;
    a microcomputer configured to control power supply to portions of the communication apparatus from the battery;
    a non-volatile memory configured to store firmware; and
    a first wireless communication processor that includes a memory different from the non-volatile memory and configured to hold the firmware, and the first wireless communication processor being configured to communicate with an external apparatus by executing the firmware held in the memory;
    wherein the microcomputer is configured to provide transfer processing to transfer the firmware stored in the non-volatile memory to the first wireless communication processor for holding in the memory,
    wherein the microcomputer supplies power to the first wireless communication processor even in a case where the communication apparatus is set to the off state, and
    wherein, in a case where the battery is detached and the power supply is stopped, the memory deletes the firmware that the memory holds, and in a case where the battery is then attached and the power supply is started, the transfer processing receives the power supply from the battery by the microcomputer and transfers the firmware to the memory even in a case where the communication apparatus is set to the off state by the power switch.

2. The communication apparatus according to claim 1, wherein the power supply from the battery to the communication apparatus is supplied in the case that the battery is attached to the communication apparatus.

3. The communication apparatus according to claim 2, wherein, in a case where the power supply from the battery to the communication apparatus is supplied and also the communication apparatus is set to the off state, the microcomputer stops the power supply to the transfer processing after the transfer of the firmware by the transfer processing has completed.

4. The communication apparatus according to claim 1, wherein the memory is a volatile memory.

5. The communication apparatus according to claim 1, wherein the first wireless communication processor is a wireless communication chip including the memory.

6. The communication apparatus according to claim 1, wherein the first wireless communication processor executes communication based on Bluetooth Low Energy.

7. The communication apparatus according to claim 1, further comprising a second wireless communication processor that is different from the first wireless communication processor.

8. The communication apparatus according to claim 7, wherein the second wireless communication processor is configured to execute communication based on a wireless LAN.

9. The communication apparatus according to claim 7, wherein the second wireless communication processor is not communicable with the external apparatus in a case where the communication apparatus is set to the off state.

10. The communication apparatus according to claim 7, wherein, while the communication apparatus is set to the off state, the first wireless communication processor executes processing of executing the firmware held in the memory to communicate with the external device and handing over the communication to the second wireless communication processor.

11. A control method for a communication apparatus to which a battery can be detachably attached and which includes a storage unit configured to store firmware, a memory unit that is different from the storage unit and configured to hold the firmware, and a first communication unit configured to communicate with an external apparatus by executing the firmware held in the memory unit, the control method comprising:
    setting the communication apparatus to an on or off state;
    controlling power supply from the battery to units of the communication apparatus;
    transferring the firmware stored in the storage unit to the first communication unit for holding in the memory unit;
    supplying power to the first communication unit even in a case where the communication apparatus is set to the off state; and in a case where the battery is detached and the power supply is stopped, deleting the firmware that the memory holds, and in a case where the battery is then attached and the power supply is started, receiving the power supply from the battery and transferring the firmware to the memory even in a case where the communication apparatus is set to the off state.

12. The communication apparatus according to claim 1, further comprising a detection unit configured to detect attachment of the battery.

13. The communication apparatus according to claim 12, wherein the detection unit is a mechanical switch that is pressed when the battery is attached.

14. The communication apparatus according to claim 1, further comprising an image pickup unit, wherein, when the battery is attached and the power supply is started and in a case where the communication apparatus is set to the on state by the setting unit and the image pickup unit has received a user operation, the image pickup unit is initialized with higher priority than transfer of the firmware by the transfer unit.

15. A communication apparatus comprising:
    a battery holder configured to detachably hold a battery;
    a power switch configured to set the communication apparatus to an on state or an off state;
    a microcomputer configured to control power supply to portions of the communication apparatus from the battery held by the battery holder;
    a non-volatile memory configured to store firmware; and
    a first wireless communication processor that includes a memory different from the non-volatile memory, configured to hold the firmware in the memory and configured to communicate with an external apparatus by executing the firmware held in the memory;
    wherein, in a case where the battery is detached from the battery holder to stop the power supply and the firmware held in the memory is deleted, in response to attaching the battery to the battery holder again the microcomputer controls the power supply from the battery to transfer the firmware to the memory from the non-volatile memory even in a case where the communication apparatus is set to the off state by the power switch.

16. The communication apparatus according to claim 15, wherein the power supply from the battery to the microcomputer is kept while the battery is held by the battery holder, regardless of whether the communication apparatus is set to the on state or the off state.

17. The communication apparatus according to claim 15, further comprising a detection unit configured to detect attachment of the battery.

18. The communication apparatus according to claim 17, wherein the detection unit is a mechanical switch that is pressed when the battery is attached.

19. The communication apparatus according to claim 15, further comprising an image pickup unit, wherein, when the battery is attached and the power supply is started and in a case where the communication apparatus is set to the on state by the setting unit and the image pickup unit has received a user operation, the image pickup unit is initialized with higher priority than transfer of the firmware by the transfer unit.

20. The communication apparatus according to claim 15, wherein the memory is a volatile memory.

21. The communication apparatus according to claim 15, wherein the first wireless communication processor is a wireless communication chip including the memory.

22. The communication apparatus according to claim 15, wherein the first wireless communication processor executes communication based on Bluetooth Low Energy.

23. The communication apparatus according to claim 15, further comprising a second wireless communication processor that is different from the first wireless communication processor.

24. The communication apparatus according to claim 23, wherein the second wireless communication processor is configured to execute communication based on a wireless LAN.

25. The communication apparatus according to claim 23, wherein the second wireless communication processor is not communicable with the external apparatus in a case where the communication apparatus is set to the off state.

26. The communication apparatus according to claim 23, wherein, while the communication apparatus is set to the off state, the first wireless communication processor executes processing of executing the firmware held in the memory to communicate with the external device and handing over the communication to the second wireless communication processor.

27. A control method of a communication apparatus, the communication apparatus including a battery holder configured to detachably hold a battery, a power switch configured to set the communication apparatus to an on state or an off state, a non-volatile memory configured to store firmware, and a first wireless communication processor that includes a memory different from the non-volatile memory and that is configured to hold the firmware in the memory and configured to communicate with an external apparatus by executing the firmware held in the memory, the control method comprising:

in a case where the battery is detached from the battery holder to stop the power supply and the firmware held in the memory is deleted, controlling the power supply from the battery to transfer the firmware to the memory from the non-volatile memory, in response to attaching the battery to the battery holder again, even in a case where the communication apparatus is set to the off state by the power switch.

28. A non-transitory computer-readable storage medium storing a program of instructions for causing a computer to execute a control method of a communication apparatus, the communication apparatus including a battery holder configured to detachably hold a battery, a power switch configured to set the communication apparatus to an on state or an off state, a non-volatile memory configured to store firmware, and a first wireless communication processor that includes a memory different from the non-volatile memory and that is configured to hold the firmware in the memory and configured to communicate with an external apparatus by executing the firmware held in the memory, the control method comprising:

in a case where the battery is detached from the battery holder to stop the power supply and the firmware held in the memory is deleted, controlling the power supply from the battery to transfer the firmware to the memory from the non-volatile memory, in response to attaching the battery to the battery holder again, even in a case where the communication apparatus is set to the off state by the power switch.

* * * * *